United States Patent [19]
Marshall Byars

[11] Patent Number: 6,032,688
[45] Date of Patent: Mar. 7, 2000

[54] SEALING DEVICE FOR A VALVE OF AN INSULATED PIPE

[76] Inventor: Ann L. Marshall Byars, 119 Mable, Baytown, Tex. 77520

[21] Appl. No.: 09/119,760

[22] Filed: Jul. 21, 1998

[51] Int. Cl.[7] .................................................... F16L 59/16
[52] U.S. Cl. ........................................... 137/375; 137/382
[58] Field of Search ..................................... 137/375, 377, 137/382; 138/178

[56] References Cited

U.S. PATENT DOCUMENTS

| | | |
|---|---|---|
| 2,601,840 | 7/1952 | Smith et al. . |
| 2,737,972 | 3/1956 | Callery . |
| 3,738,383 | 6/1973 | David . |
| 4,407,324 | 10/1983 | Caddell . |
| 4,453,562 | 6/1984 | Palkovics . |
| 4,868,318 | 9/1989 | Scherer, Jr. et al. ..................... 549/362 |
| 5,368,065 | 11/1994 | Humpert et al. . |
| 5,533,547 | 7/1996 | Arn ......................................... 137/360 |
| 5,904,175 | 5/1999 | Helmsderfer .............................. 137/375 |

*Primary Examiner*—John Fox
*Attorney, Agent, or Firm*—Harrison & Egbert

[57] ABSTRACT

A sealing device for an insulated valve of an insulated pipe having a sleeve formed of a flexible material with an opening at a top thereof having a size suitable for allowing the valve handle to pass therethrough and a base formed of a flexible material and affixed to a bottom of the sleeve and extending upwardly therefrom. The base has an annular area corresponding to the bottom of the sleeve. A band is attached to the base for allowing the base to be affixed to the outer surface of the insulation. The sleeve has an elastic member extending outwardly of the opening at the top of the sleeve. The base is a generally flat sheet. The sleeve has an interior longitudinal axis extending transverse to a plane of the base. The sleeve and the base are formed of an elastomeric material. The sleeve and the base extend entirely around a cutout area of insulation formed at the valve handle of the valve.

9 Claims, 2 Drawing Sheets

SEALING DEVICE FOR A VALVE OF AN INSULATED PIPE

TECHNICAL FIELD

The present invention relates generally to the insulation of industrial piping. More particularly, the present invention relates to devices for preventing water intrusion into the insulation material surrounding a valve handle of an insulated pipeline.

BACKGROUND ART

Many industrial installations require extensive use of above-ground, outdoor pipe systems for handling a wide variety of fluids which are temperature sensitive in the sense that thermal insulation is required or desirable in the attainment of overall fluid handling efficiency. Insulation of such pipe systems, in turn, is most effectively accomplished by suspending each pipe in space from appropriate supports by depending rods connected to the pipe at spaced intervals along the length thereof, placing any of several acceptable insulating materials around the periphery of the pipe and covering the insulation with an impermeable jacketing material such as sheet plastic, stainless steel, fiber reinforced resin, or the like. The jacketing functions primarily to protect the insulation from deterioration from impregnation of dust and/or water as well as from physical damage.

With all such available insulation jacketing, particularly in outdoor pipe installations, a serious problem is presented by the presence of vertically-projecting pipe appendages such as hanger rods, valve stems, and the like. Such pipe appendages must project through the insulation and jacketing in a way so as to require a caulking-like sealant between the stem or rod and the pipe jacketing in order to effect a complete hermetic seal. Such sealants, however, even with regular maintenance, deteriorate with age and exposure to result in a leakage point in the context of the overall hermetic seal provided by the jacketing. Moreover, because of the location of the caulking-type seal at the base of the vertically-extending rod or valve stem, the point of leakage is most vulnerable to water running down the surface of the rod or valve stem. As a result of this problem, serious damage is caused both to the insulation underlying the jacket, components entrained in the insulation, and often to the pipe itself. The wetting of insulation in the base of hanger rods, valve stems, and the like, can require replacement of insulation as often as once a year in many industrial installations. Also, because of the toxic nature of the atmosphere in which industrial pipe systems are used, rainwater can become sufficiently corrosive to damage the pipe itself, particularly in the concentrated area underlying a suspension rod, for example. In other types of installations where electrical tracers are embedded in the insulation, the tracers are severely damaged so as to require replacement on a regular basis.

In the past, various patents have issued on devices which attempt to protect valve stems from the intrusion of external elements. For example, U.S. Pat. No. 2,601,840, issued on Jul. 1, 1952 to Smith et al., describes an indicating protective cover for pipe flanges. In this patent, a frustoconical-shaped flexible covering material extends over the valve stem and around the valve body of a non-insulated pipeline. Laces are tied together so as to seal edges of the covering material together.

U.S. Pat. No. 2,737,972, issued on Mar. 13, 1956 to Callery et al., describes a bonnet shield for valves. In this bonnet shield, a small hole is formed at the top of a frustoconical-shaped cover. The edges of the cover are buttoned together so as to cover the valve housing above the valve section of a non-insulated pipeline.

U.S. Pat. No. 3,738,383, issued on Jun. 12, 1973 to W. David, describes a valve housing which is surrounded by a one-piece sheath of elastically distendable material resistant to ambient influences. The hollow interior of the sheath has an interior contour which corresponds to the outer contour of the structure. The sheath tightly encases the structure in surface-to-surface relationship therewith.

U.S. Pat. No. 4,407,324, issued on Oct. 4, 1983 to J. P. Caddell, describes a valve stem cover apparatus for protecting hand operable valves. The valve stem cover has an open-ended nipple section on its upper end for receiving the valve stem therethrough. The nipple is provided with a plurality of laterally projecting ribbed edges. A tubular flexible, rubber-like sleeve section attaches to the nipple for frictionally engaging the ribbed edges. A cap encloses the uppermost second end of the tube section so as to encapsulate the valve stem together with the tube and the valve stem cover.

U.S. Pat. No. 4,453,562, issued on Jun. 12, 1984 to W. J. Palkovics, describes a rain shield accessory for jacketed insulated pipe installations having vertically projecting rod-like appendages. The rain shield is an inverted funnel-shaped member of resilient sheet material which defines a frustoconical body portion joined at its upper end with a coaxial cylindrical neck portion of the valve stem. The sheet material from which the member is formed is precurled about the axis of the body to provide a voluted overlap particularly in the region of the cylindrical neck portion so that the member can be opened and placed about rod-like appendages of varying diameters.

U.S. Pat. No. 5,368,065, issued on Nov. 29, 1994 to Humpert et al., describes a leak shield for a recessed valve. The shield is of an elastically deformable waterproof material and is formed unitarily with a cup-shaped body generally surrounding the plumbing fixture with an annular bellows-type cuff surrounding the control part and having a rear edge unitarily joined to the body and a front edge fixed to a wall surface at the hole edge.

It is an object of the present invention to provide a sealing device which prevents liquid and chemical intrusion into the insulation material of an insulated pipeline.

It is another object of the present invention to provide a sealing device which effectively seals the valve stem of an insulated valve.

It is another object of the present invention to provide a sealing device which can be easily applied around a cutout region of the insulation surrounding a valve of an insulated pipeline.

It is another object of the present invention to provide a sealing device which is adaptable to and easily applied to various types of valve stems.

It is a further object of the present invention to provide a sealing device which is easy to use, relatively inexpensive, and easy to manufacture.

These and other objects and advantages of the present invention will become apparent from a reading of the attached specification and appended claims.

SUMMARY OF THE INVENTION

The present invention is a sealing device for a valve of an insulated pipe. The device comprises a sleeve formed of a flexible material and having an opening at a top thereof with a size suitable for allowing a valve handle to pass therethrough, a base formed of a flexible material and affixed to a bottom of the sleeve, and an affixation means attached to the base for allowing the base to be affixed to an outer surface of the insulation surrounding the valve. The base has an annular area corresponding to the bottom of the sleeve.

The sleeve has an elastic member extending outwardly of the opening at the top of the sleeve. This elastic member is a flexible tubular member extending upwardly from the top. This tubular member has an interior suitable for receiving a portion of the valve handle therein in generally liquid-tight relationship therewith. The elastic member has a bottom which communicates with the interior of the sleeve.

In one embodiment of the present invention, the sleeve comprises a stacked arrangement of concentric rings. A large diameter concentric ring is affixed to the base. The opening in the top is formed in a small diameter ring. The sleeve has a narrow external diameter at the top and a wide external diameter at the base. In another embodiment of the present invention, the sleeve has a frustoconical configuration with a narrow diameter at the top and a wide diameter at the base.

The base is a generally flat sheet which is flexible enough to conform to the curvature of the insulation surrounding the valve. The sleeve is positioned generally centrally of the base. The sleeve has an interior longitudinal axis which extends transverse to a plane of the base. The sleeve and the base are formed of an elastomeric material.

The affixation means of the present invention can include a wide variety of means for attaching the base to the surface of the insulation surrounding the valve. In the preferred form of the present invention, a first band extends over a top surface of the base on one side of the sleeve and a second band extends over a top surface of the base on an opposite side of the sleeve. The first and second bands have a length suitable for extending around the outer surface of the insulation surrounding the valve. In other forms of the present invention, the affixation means can include silicon-based adhesives, bolts, fasteners, and other devices.

In use, the sleeve and the base will extend entirely over a cutout area formed in the insulation adjacent to the valve handle.

DETAILED DESCRIPTION OF THE PRESENT INVENTION

Figure 1:
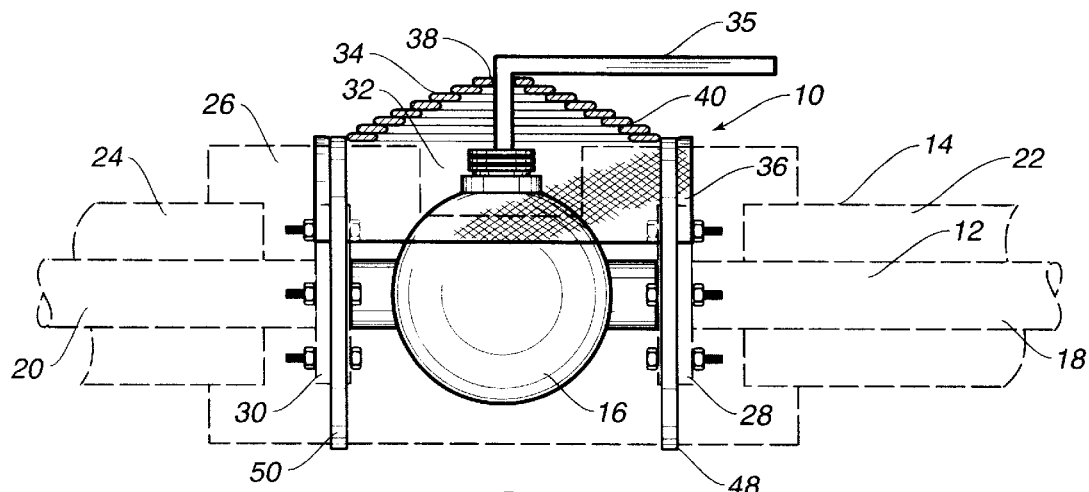
FIG. 1 is a side elevational view illustrated in clear form of the sealing device of the present invention as applied over a valve handle of a valve in an insulated pipeline.

Referring to FIG. 1, there is diagrammatically illustrated the sealing device 10 of the present invention as applied to a pipeline 12 having insulation material 14 extending there- around. A valve 16 is positioned between a first pipe 18 and a second pipe 20 of the pipeline 12. Insulation 22 surrounds the first pipe 18. Insulation 24 surrounds the second pipe 20. Insulation 26 surrounds the valve 16. The insulation 26 will extend over the ends of the insulation 22 and 24 of pipes 18 and 20, respectively. The pipe 18 is connected to the valve 16 through the use of flanges 28. Similarly, the second pipe 20 is attached to the valve 16 through the use of flanges 30. In FIG. 1, it can be seen that a cutout area 32 is formed in the insulation 26 surrounding the valve 16 adjacent to the valve handle 35. The device 10 of the present invention is placed over the valve handle 35 and over the cutout area 32 so as to effectively prevent liquid intrusion from affecting the insulation material 26 and from adversely affecting the integrity of the valve 16.

In FIG. 1, it can be seen that the device 10 includes a sleeve 34 and a base 36. The sleeve 34 is formed of a flexible material. The sleeve 34 has an opening 38 formed at a top thereof. As can be seen, the opening 38 has a size suitable for allowing the valve handle 35 to pass therethrough. The base 36 is also formed of a flexible material. The base is affixed to a bottom of the sleeve 34 and extends outwardly therefrom. The base has an annular opening at 40 corresponding to the bottom of the sleeve 34. The base 36 has an area suitable for extending entirely over the cutout area 32 of the insulation 26 associated with the valve 16.

So as to securely mount the sealing device 10 onto the insulation material 26 associated with valve 16, a first band 48 extends over a top surface of the base 36 and around the insulation 26. A second band 50 also extends around the base 36 on an opposite side of the valve handle 35 and around the insulation material 26. The bands 48 and 50 can be metallic bands which are suitably adjustable so as to provide a secure liquid-tight seal between the base 36 and the outer surfaces of the insulation 26. In the arrangement shown in FIG. 1, the device 10 suitably prevents liquid intrusion from entering into the cutout area 32 of the insulation 26.

In the present invention, it should be noted that various other means can be provided for attaching the base 36 to the outer surface of the insulation 26. For example, waterproof adhesives, such as silicone-based adhesives, can be interposed between the inner surface of the base 36 and the outer surface of the insulation material 26. In another form of the present invention, the base 36 can be suitably screwed, bolted, or mechanically fastened to the insulation material 26. It is believed that the bands 48 and 50 are the preferred form of the present invention since the bands 48 and 50 can be suitably removed so as to allow access to the cutout area 32 and to the connection of the valve handle 35.

Figure 2A:
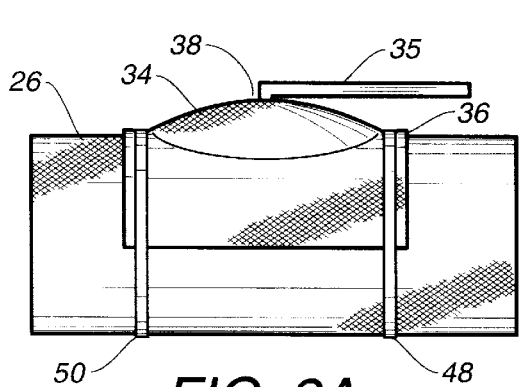
FIGS. 2(a) and 2(b) are side elevational views illustrating the present invention as applied to different types of valve handles.
Figure 2B:
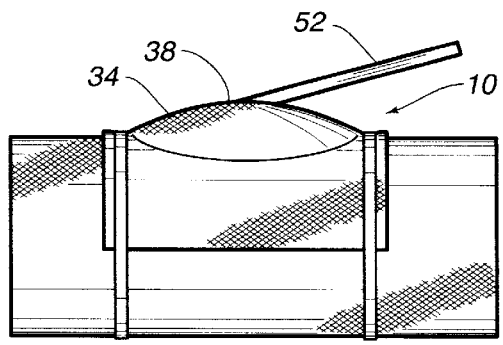

FIG. 2(a) illustrates the manner in which the sleeve 34 is connected to the base 36 such that the valve handle 35 extends outwardly through an opening 38 in the sleeve 34. Bands 48 and 50 serve to securely fasten the base 36 around the outer surfaces of the insulation material 26 associated with the valve contained therein. FIG. 2(b) shows the manner in which an angularly extending handle 52 can also extend through the opening 38 in the sleeve 34 of the device 10. As such, it can be seen that the device 10 is adaptable to various forms of valve handles.

Figure 3:
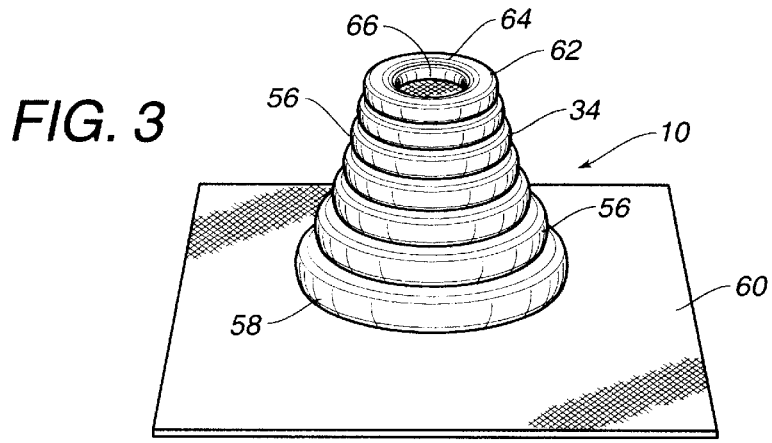
FIG. 3 is an isolated perspective view showing one embodiment of the sealing device of the present invention.

FIG. 3 is an isolated view showing one form of the device 10. In FIG. 3, it can be seen that the sleeve 34 is formed of a plurality of concentric rings 56 that are arranged in a stacked configuration. The largest diameter concentric ring 58 is affixed to the base 60. The narrowest diameter concentric ring 62 is at the top of the sleeve 34. An elastic ridge 64 is formed in the opening 66 in the uppermost concentric ring 62. The elastic ridge 64 is suitable for elastic and water-tight engagement with an external surface of the valve handle 35. In FIG. 3, it will be noted that the base 60 has a generally square configuration and has an area which is substantially greater than the area of the largest concentric ring 58. The sleeve 34 is illustrated as located generally centrally of the base 60. The base 60 will have an annular area below the lowermost concentric ring 58 which corresponds to the interior diameter of the lowermost concentric ring 58. The lowermost concentric ring 58 is in sealed watertight relationship with the base 60.

Figure 4:
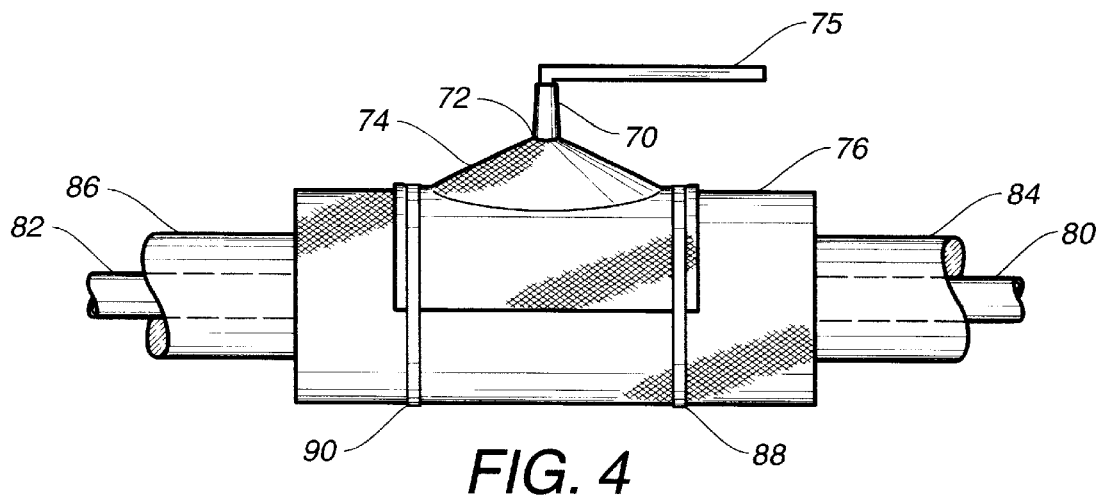
FIG. 4 is a side elevational view showing another embodiment of the present invention as applied over the insulation of an insulated pipeline.

FIG. 4 shows an alternative form of the present invention. In FIG. 4, it can be seen that an elastic member 70 extends outwardly from the top 72 of a frustoconical-shaped sleeve 74. The elastic sleeve 70 is suitably flexible and elastic so as to be tightly secured around the outer diameter of the valve handle 75. In order to install the valve handle 75 through the elastic member 70, it is only necessary to thread the sleeve 74 and the elastic member 70 around the outer diameter of the valve handle 75. The sleeve 74 is connected, at its bottom, to the base 76. Base 76 is applied over the outer surface of insulation 78 surrounding the valve positioned between pipes 80 and 82. Pipe 80 includes insulation 84. Pipe 82 includes insulation 86. Bands 88 and 90 extend around the base 76 so as to securely affix the base 76 onto the insulation 78. The frustoconical-shaped sleeve 74 will have a narrow diameter at the elastic member 70 at top 72 and a wide diameter at the base 76.

Figure 5:
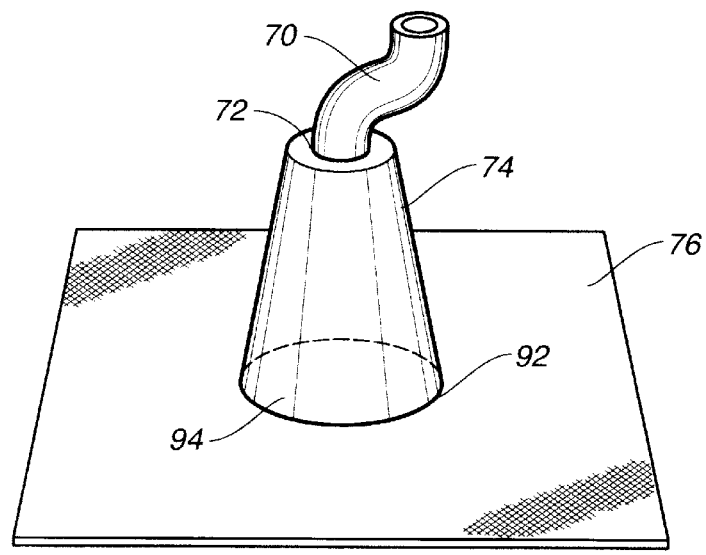
FIG. 5 is a perspective view of the sealing device in accordance with the embodiment of FIG. 4.

In FIG. 5, the configuration of the sleeve 74 and the elastic member 70 are shown with particularity. In FIG. 5, it can be seen that the sleeve 74 has a wide diameter 92 at the base 76. The base 76 includes an annular area 94 which communicates with the interior of the sleeve 74. The elastic member 70 extends outwardly from the opening 72 at the top of the sleeve 74. The elastic member 70 is suitably flexible and elastic so as to "droop" when not attached to the valve handle 75. When installed on the valve handle 75, the elastic member 70 will be in compressive contact with the outer surfaces of the valve handle 75 so as to prevent liquid intrusion from entering into the interior of the sleeve 74.

Figure 6:
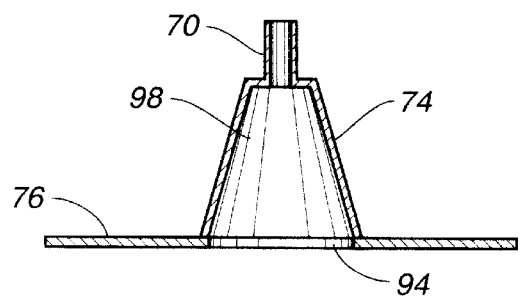
FIG. 6 is a cross-sectional side view of the sealing device of the embodiment of FIG. 4.

FIG. 6 illustrates, in a cross-sectional view, the arrangement of the frustoconical-shaped sleeve 74, the base 76, and the elastic member 70. As can be seen, the base 76 includes an annular area 94 at the bottom which opens into the interior 98 of the sleeve 74. The elastic member 70 includes an interior passageway 100 which will communicate with the interior 98 of the sleeve 74.

The present invention is a flexible resistant cover placed over industrial pipelines which prevent water and other fluids from damaging the insulation fitted around the lines. As such, it allows a greater portion of the valve to be insulated. It may be also used as an insulating barrier for pipes and lines entering and exiting homes and other buildings.

In use, a user will select an appropriate size of the device 10 so as to place over a pipeline valve (dependent on the design of the valve to be used). The appropriate size would be placed over the pipeline valve with the flexible square base banded around the surface of the insulation to provide a tight water-resistant seal. The sealing device can be secured over the valve with metallic banding, a silicone-based adhesive, bolts, or like methods. The sealing device provides the user with an easily installed, cost-effective method of insulating a standard pipeline valve. Additionally, the water-resistant seal created by the sealing device 10 of the present invention prevents water, acid or other liquids from damaging the insulation surrounding the immediate area of the valve and allows more of the valve to be insulated.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. An apparatus comprising:
    a valve having a valve handle extending outwardly therefrom;
    a valve insulation extending at least partially over said valve, said valve insulation having a cutout area extending around said valve handle;
    a sleeve formed of a flexible material, said sleeve extending around a portion of said valve handle; and
    a base affixed to a bottom of said sleeve and extending outwardly therefrom, said base extending over said cutout area, said base being affixed onto said valve insulation.

2. The apparatus of claim 1, said sleeve and said base being formed of an elastomeric material.

3. The apparatus of claim 2, said sleeve being in generally liquid-tight relationship with said valve handle.

4. The apparatus of claim 3, said sleeve having an elastic member extending outwardly therefrom at an end opposite said base, said elastic member being in generally liquid-tight relationship with said valve handle.

5. The apparatus of claim 1, further comprising:
    affixation means attached to said base for affixing said base to an outer surface of said valve insulation.

6. The apparatus of claim 5, said affixation means comprising:
    a first band extending over a top surface of said base and around said valve insulation on one side of said valve handle; and
    a second band extending over a top surface of said base and around said valve insulation on an opposite of said valve handle.

7. The apparatus of claim 1, said sleeve and said base entirely covering said cutout area of said valve insulation.

8. The apparatus of claim 1, further comprising:
    a first pipe connected to said valve, said first pipe having insulation extending therearound; and
    a second pipe connected to said valve, said second pipe having insulation extending therearound.

9. The apparatus of claim 1, said base having a hole corresponding to an interior of said sleeve, said sleeve having a bottom edge sealingly to said base around said hole, said sleeve extending upwardly from said base.

* * * * *